(12) United States Patent
Lee et al.

(10) Patent No.: US 10,833,397 B2
(45) Date of Patent: Nov. 10, 2020

(54) FOLDABLE DEVICE COMPRISING ANTENNA

(71) Applicant: Samsung Electronics Co., Ltd, Suwon-si (KR)

(72) Inventors: Woosup Lee, Suwon-si (KR); Yongyoun Kim, Suwon-si (KR); Jungsik Park, Suwon-si (KR); Sehwan Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/562,179

(22) Filed: Sep. 5, 2019

(65) Prior Publication Data

US 2020/0076062 A1 Mar. 5, 2020

(30) Foreign Application Priority Data

Sep. 5, 2018 (KR) .................. 10-2018-0105928

(51) Int. Cl.
*H01Q 1/24* (2006.01)
*H04M 1/02* (2006.01)
*H01Q 5/307* (2015.01)

(52) U.S. Cl.
CPC ............ *H01Q 1/243* (2013.01); *H01Q 5/307* (2015.01); *H04M 1/0268* (2013.01); *H04M 1/0277* (2013.01); *H04M 1/0291* (2013.01)

(58) Field of Classification Search
CPC ..... H01Q 1/243; H01Q 5/307; H04M 1/0291; H04M 1/0268; H04M 1/0277
USPC ..................................... 455/575.3
See application file for complete search history.

(56) References Cited

U.S. PATENT DOCUMENTS

| | | | |
|---|---|---|---|
| 6,031,497 A | 2/2000 | Nam | |
| 7,290,718 B2 | 11/2007 | Sekita | |
| 10,075,569 B2 | 9/2018 | Kim et al. | |
| 10,079,425 B2 | 9/2018 | Chun et al. | |
| 2006/0118625 A1 | 6/2006 | Sekita | |
| 2007/0080872 A1* | 4/2007 | Nishikido | H01Q 1/243 343/702 |
| 2009/0264156 A1* | 10/2009 | Burghardt | H04M 1/021 455/566 |
| 2013/0106666 A1* | 5/2013 | Shan | H01Q 21/28 343/725 |
| 2014/0097992 A1* | 4/2014 | Cheng | H01Q 1/2266 343/702 |
| 2014/0240178 A1 | 8/2014 | Chun et al. | |

(Continued)

FOREIGN PATENT DOCUMENTS

CN 105789827 A 7/2016
KR 10-2008-0019326 A 3/2008

(Continued)

OTHER PUBLICATIONS

ISA/KR, International Search Report, International Application No. PCT/KR2019/011454, dated Jan. 3, 2020, 3 pages.

*Primary Examiner* — Congvan Tran

(57) ABSTRACT

Disclosed is an electronic device. The electronic device may comprise a first structure and a second structure mutually foldably connected with the first structure about a first axis extending in a first direction. A wireless communication circuit of the electronic device is electrically connected with a first radiator and a second radiator and is electrically separated from the second radiator in a folded state.

19 Claims, 14 Drawing Sheets

(56) References Cited

U.S. PATENT DOCUMENTS

| | | | |
|---|---|---|---|
| 2015/0097755 A1* | 4/2015 | Kim | G06F 3/1446 345/1.3 |
| 2017/0142241 A1 | 5/2017 | Kim et al. | |
| 2018/0219274 A1 | 8/2018 | Wang et al. | |
| 2018/0358684 A1 | 12/2018 | Chun et al. | |
| 2019/0007533 A1 | 1/2019 | Kim et al. | |
| 2019/0068764 A1* | 2/2019 | Liu | H04M 1/0214 |

FOREIGN PATENT DOCUMENTS

| | | |
|---|---|---|
| KR | 10-20080-019326 A | 3/2008 |
| KR | 10-2017-0056292 A | 5/2017 |

* cited by examiner

FOLDABLE DEVICE COMPRISING ANTENNA

CROSS-REFERENCE TO RELATED APPLICATION

This application is based on and claims priority under 35 U.S.C. § 119 to Korean Patent Application No. 10-2018-0105928 filed on Sep. 5, 2018 in the Korean Intellectual Property Office, the disclosure of which is incorporated by reference herein its entirety.

BACKGROUND

1. Field

The disclosure relates to relates to a technology for an antenna included in a foldable device.

2. Description of Related Art

An electronic device may be implemented to be foldable for portability. For example, an electronic device such as a notebook or a smartphone may be implemented to be foldable through a hinge structure.

This portable electronic device may include a plurality of antennas for multiple bands. The exterior of the electronic device may be formed of a metal housing for rigidity. The plurality of antennas may be implemented by using a metal member (e.g., a metal housing or a metal structure mounted therein) included in the electronic device.

The above information is presented as background information only to assist with an understanding of the disclosure. No determination has been made, and no assertion is made, as to whether any of the above might be applicable as prior art with regard to the disclosure.

SUMMARY

A foldable device may include various antennas (e.g., antennas for wireless fidelity (Wi-Fi), long term evolution (LTE), global positioning system (GPS), and the like). The antennas included in the foldable device may overlap each other when the foldable device is folded, and thus may have a mutual influence. For example, when different antennas overlap each other, resonant frequencies of the antennas may vary, or performances of the antennas may be degraded. In particular, a foldable device including a metal housing may include antennas that use a portion of the metal housing as a radiator. When the foldable device is folded, the performances of the antennas may be degraded because the antennas overlap each other.

Aspects of the disclosure are to address at least the above-mentioned problems and/or disadvantages and to provide at least the advantages described below. Accordingly, an aspect of the disclosure is to provide an electronic device capable of implementing a plurality of antennas, with a metal housing included therein.

In accordance with an aspect of the disclosure, an electronic device may include a housing that includes a first structure, and a second structure mutually foldably connected with the first structure about a first axis extending in a first direction, at least a portion of the housing including a metal region, and the first structure and the second structure being disposed to face each other in a folded state and are disposed to face a same direction in an unfolded state, a first radiator that forms at least a portion of the metal region of the first structure, a second radiator that forms at least a portion of the metal region of the second structure and is disposed to face at least a portion of the first radiator in the folded state, and at least one wireless communication circuit is disposed in the housing, and the at least one wireless communication circuit may be electrically connected with the first radiator and the second radiator and may be electrically separated from the second radiator in the folded state.

In accordance with another aspect of the disclosure, an electronic device may include a housing that includes a first structure, and a second structure mutually foldably connected with the first structure about a first axis extending in a first direction, at least a portion of the housing including a metal region, and the first structure and the second structure being disposed to face each other in a folded state and are disposed to face a same direction in an unfolded state, a hinge structure that is connected with the first structure and the second structure such that the first structure and the second structure are folded or unfolded about the first axis, a first radiator that forms at least a portion of the metal region of the first structure, a second radiator that forms at least a portion of the metal region of the second structure and is disposed to face at least a portion of the first radiator in the folded state, and at least one wireless communication circuit disposed in the housing, and the at least one wireless communication circuit may be electrically connected with the first radiator and may be electrically connected with the second radiator through a switch, and the switch may be open in the folded state.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

With regard to description of drawings, similar components may be marked by similar reference numerals.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure will be described with reference to accompanying drawings. However, those of ordinary skill in the art will recognize that modification, equivalent, and/or alternative on various embodiments described herein can be variously made without departing from the scope and spirit of the disclosure.

Figure 1:
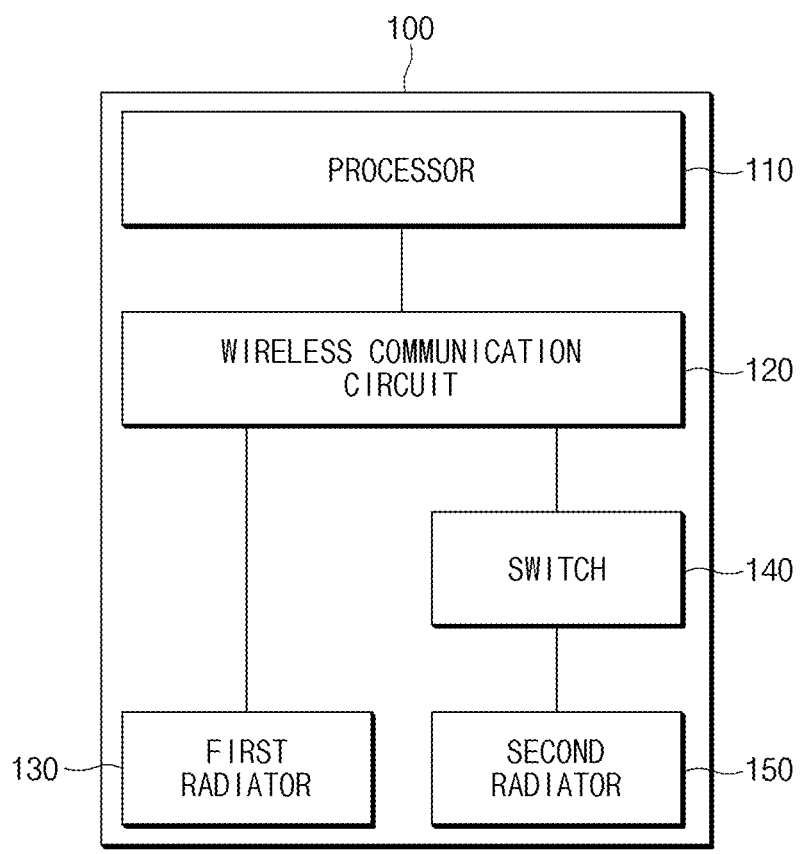
FIG. 1 illustrates a block diagram of an electronic device according to an embodiment.
Figure 2A:
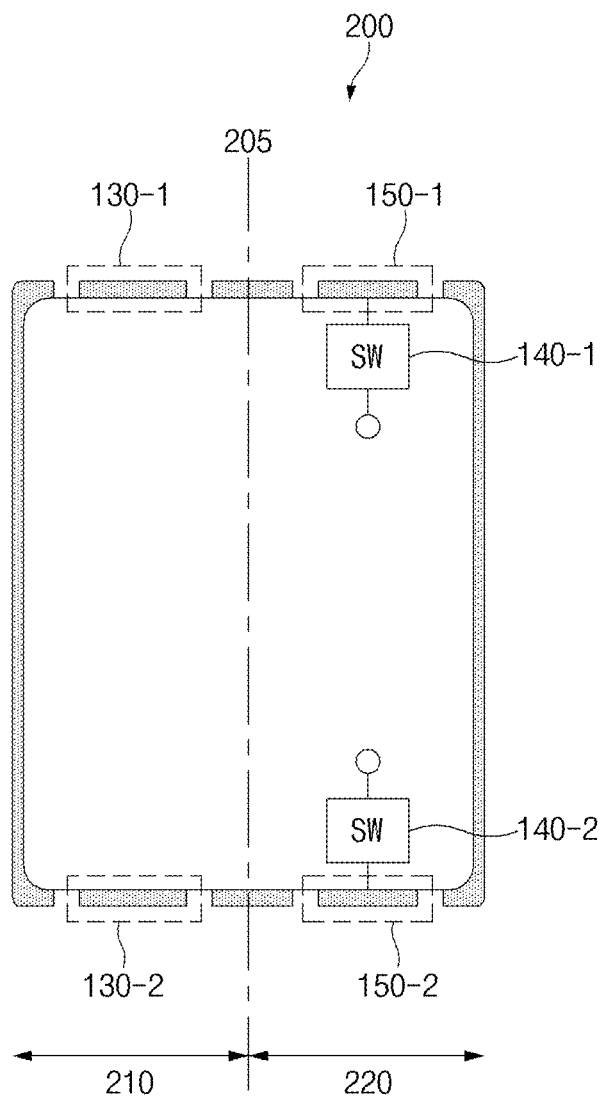
FIGS. 2A to 2C illustrate views for describing a structure of an electronic device and a folding operation of the electronic device, according to an embodiment.
Figure 2B:
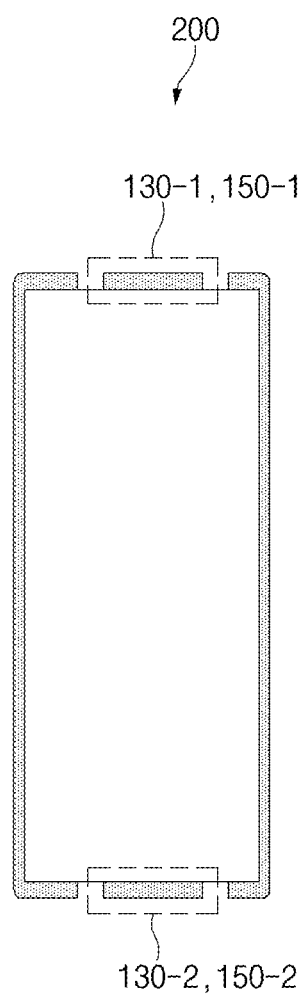
Figure 2C:
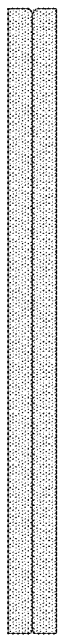

FIG. 1 illustrates a block diagram of an electronic device according to an embodiment. FIGS. 2A to 2C illustrate views for describing a structure of an electronic device and a folding operation of the electronic device, according to an embodiment.

In an embodiment, an electronic device 100 may include at least one processor 110, at least one wireless communication circuit 120, and a plurality of antennas. For example, the plurality of antennas may include a first antenna including a first radiator 130 and a second antenna including a second radiator 150.

In an embodiment, the at least one processor 110 may include an application processor and a communication processor. At least one communication processor may be implemented separately for each of the plurality of antennas, or may be integrally implemented as one communication processor for the plurality of antennas. The wireless communication circuit 120 may be controlled by the at least one processor 110.

In an embodiment, the wireless communication circuit 120 may transmit/receive a signal in a specific frequency band by using the first antenna and the second antenna. The first antenna may include the first radiator 130, a first feed point for the first radiator 130, and a first ground point. The second antenna may include the second radiator 150, a second feed point for the second radiator 150, and a second ground point. The first feed point and the first ground point may be experimentally determined depending on a target frequency band of a signal to be transmitted/received by using the first antenna. The second feed point and the second ground point may be experimentally determined depending on a target frequency band of a signal to be transmitted/received by using the second antenna.

In an embodiment, the wireless communication circuit 120 may be electrically connected with the first radiator 130 and the second radiator 150. For example, the wireless communication circuit 120 may be electrically connected with the first feed point for the first radiator 130. The wireless communication circuit 120 may transmit/receive a signal in a specific frequency band through an electrical path formed on the first radiator 130 by feeding a power to the first feed point. Likewise, the wireless communication circuit 120 may be electrically connected with the second feed point for the second radiator 150. The first ground point and the second ground point may be electrically connected with at least one ground region included in the electronic device 100.

In an embodiment, the wireless communication circuit 120 may be configured to be electrically separated from the second radiator 150 when the electronic device 100 is in a folded state. For example, the wireless communication circuit 120 may be electrically connected with the second radiator 150 through a switch 140. The switch 140 may be configured to be open when the electronic device 100 is in the folded state.

Referring to FIG. 2A, the electronic device 100 may have a flat state or an unfolded state. The electronic device 100 may have the folded state illustrated in FIGS. 2B and 2C. Alternatively, the electronic device 100 may have an intermediate state between the flat state and the folded state (not illustrated). In the specification, unless specifically stated otherwise, the "folded state" means a "fully folded state", which is distinguished from the intermediate state in which the electronic device 100 is folded with a certain angle.

In an embodiment, the electronic device 100 may include a housing 200, at least a portion of which includes a metal material. The housing 200 may be divided into a first structure 210 and a second structure 220. The second structure 220 may be mutually foldably connected with the first structure 210 about a first axis 205 extending in a first direction.

In various embodiments, the housing 200 may be understood as a metal housing.

In an embodiment, referring to FIG. 2A, the first structure 210 and the second structure 220 may be disposed to face the same direction in the unfolded state. Referring to FIGS. 2B and 2C, the first structure 210 and the second structure 220 may be disposed to face each other in the folded state, and the first structure 210 and the second structure 220 may at least partially contact each other.

In an embodiment, at least a portion of the first structure 210 may operate as a radiator of an antenna. At least a portion of the second structure 220 may operate as a radiator of an antenna. Referring to FIG. 2B, radiators 130-1 and 130-2 included in the first structure 210 and radiators 150-1 and 150-2 included in the second structure 220 may be disposed to face each other in the folded state.

Figure 3:
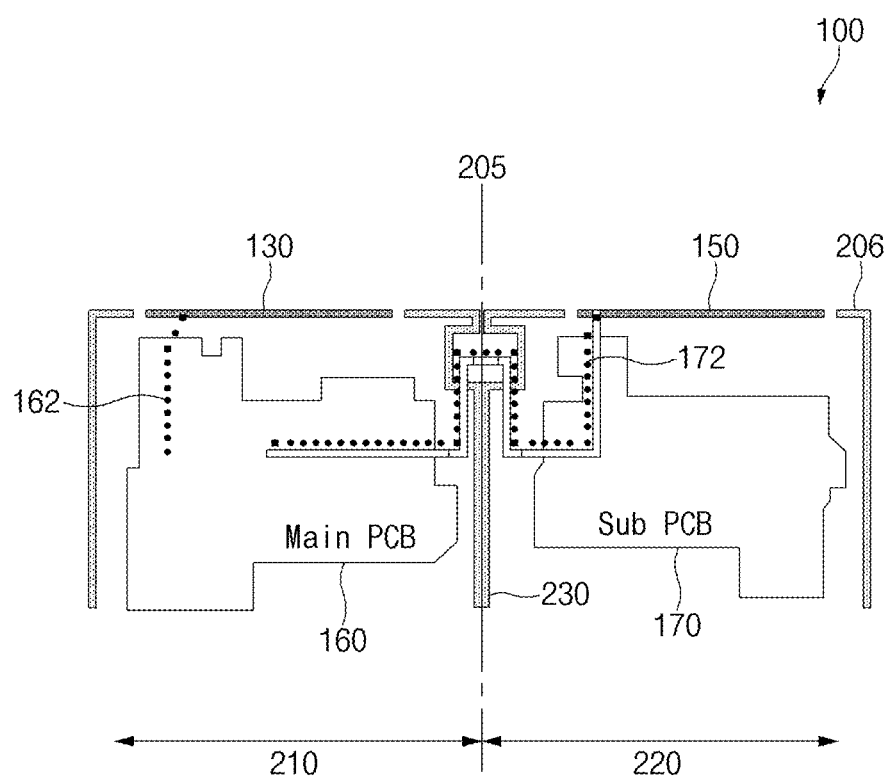
FIG. 3 illustrates an exemplary structure of an electronic device according to an embodiment.

Referring to FIG. 3, for example, at least a portion of the first structure 210 may form the first radiator 130. For example, at least a portion of the second structure 220 may form the second radiator 150. In this case, in the folded state, the second radiator 150 and at least a portion of the first radiator 130 may be disposed to face each other.

Referring to FIGS. 1 and 2A to 2C, in various embodiments, the first structure 210 and the second structure 220 may include a plurality of radiators. Likewise, in the folded state, the (2-1)-th radiator 150-1 and at least a portion of the (1-1)-th radiator 130-1 may be disposed to face each other.

In an embodiment, the wireless communication circuit 120 may be electrically connected with each of the radiators 130-1, 130-2, 150-1, and 150-2 included in the first structure 210 and the second structure 220. For example, in the unfolded state and the intermediate state, all the antennas including the radiators 130-1, 130-2, 150-1, and 150-2 may operate.

In an embodiment, the wireless communication circuit 120 may be electrically separated from the second radiator 150 (e.g., the radiators 150-1 and 150-2 of FIGS. 2A and 2B) included in the second structure 220 in the folded state. In the folded state, the first radiator 130 and the second radiator 150 may overlap each other, and the (1-1)-th radiator 130-1 and the (2-1)-th radiator 150-1 may overlap each other. Performances of antennas respectively including radiators may be degraded due to the overlapping. In particular, when overlapping radiators transmit/receive signals in similar frequency bands, the performances of antennas may be further degraded (refer to an experimental result of FIG. 4).

In an embodiment, as the second radiator 150 (e.g., the (2-1)-th radiator 150-1 and/or the (2-2)-th radiator 150-2) included in the second structure 220 is electrically separated from the wireless communication circuit 120 in the folded state, the second radiator 150 may function as a floating pattern. For example, only the antenna including the first radiator 130 (e.g., the (1-1)-th radiator 130-1 and/or the (1-2)-th radiator 130-2) of the first structure 210 may operate in the folded state. The issue that performances of antennas included in the electronic device 100 are degraded may be prevented. For example, the second radiator 150 (e.g., the (2-1)-th radiator 150-1 and/or the (2-2)-th radiator 150-2) may be electrically separated from the wireless communication circuit 120 through the switch 140 (e.g., a switch 140-1 and/or a switch 140-2) that is in a close state.

In various embodiments, the housing 200 may include a first surface facing the first direction, a second surface facing a direction opposite to the first direction, and a side surface surrounding a space between the first surface and the second surface. For example, the housing 200 illustrated in FIGS. 2A to 2C may be a portion of the side surface. The side surface may be understood as a metal bezel.

In an embodiment, the first radiator 130 may be at least a portion of the side surface, which is included in the first structure 210, and the second radiator 150 may be at least a portion of the side surface, which is included in the second structure 220. For example, the first radiator 130 may be formed in a first region of the side surface, and the second radiator 150 may be formed in a second region of the side surface, which is electrically separated from the first region.

FIG. 3 illustrates an exemplary structure of an electronic device according to an embodiment.

In an embodiment, the electronic device 100 may further include a first printed circuit board (PCB) 160 (e.g., a main PCB) disposed in the first structure 210 and a second PCB 170 disposed in the second structure 220.

In an embodiment, the wireless communication circuit 120 (not illustrated) may be disposed on the first PCB 160. The wireless communication circuit 120 may be electrically connected with the first radiator 130 of the first structure 210 through a first feed line 162 disposed on the first PCB 160. The wireless communication circuit 120 may be electrically connected with the second radiator 150 through a second feed line 172 disposed on the first PCB 160 and the second PCB 170.

In an embodiment, the electronic device 100 may further include a hinge structure 230 that is connected with the first structure 210 and the second structure 220. The hinge structure 230 may allow the first structure 210 and the second structure 220 to be folded or unfolded about the first axis 205.

In various embodiments, the second feed line 172 may be disposed at a portion of the hinge structure 230. For example, the second feed line 172 may be interposed between the first structure 210 and the second structure 220 through a wiring member (e.g., wiring members 431 and 432 of FIG. 8B) included in the hinge structure 230.

Figure 4:
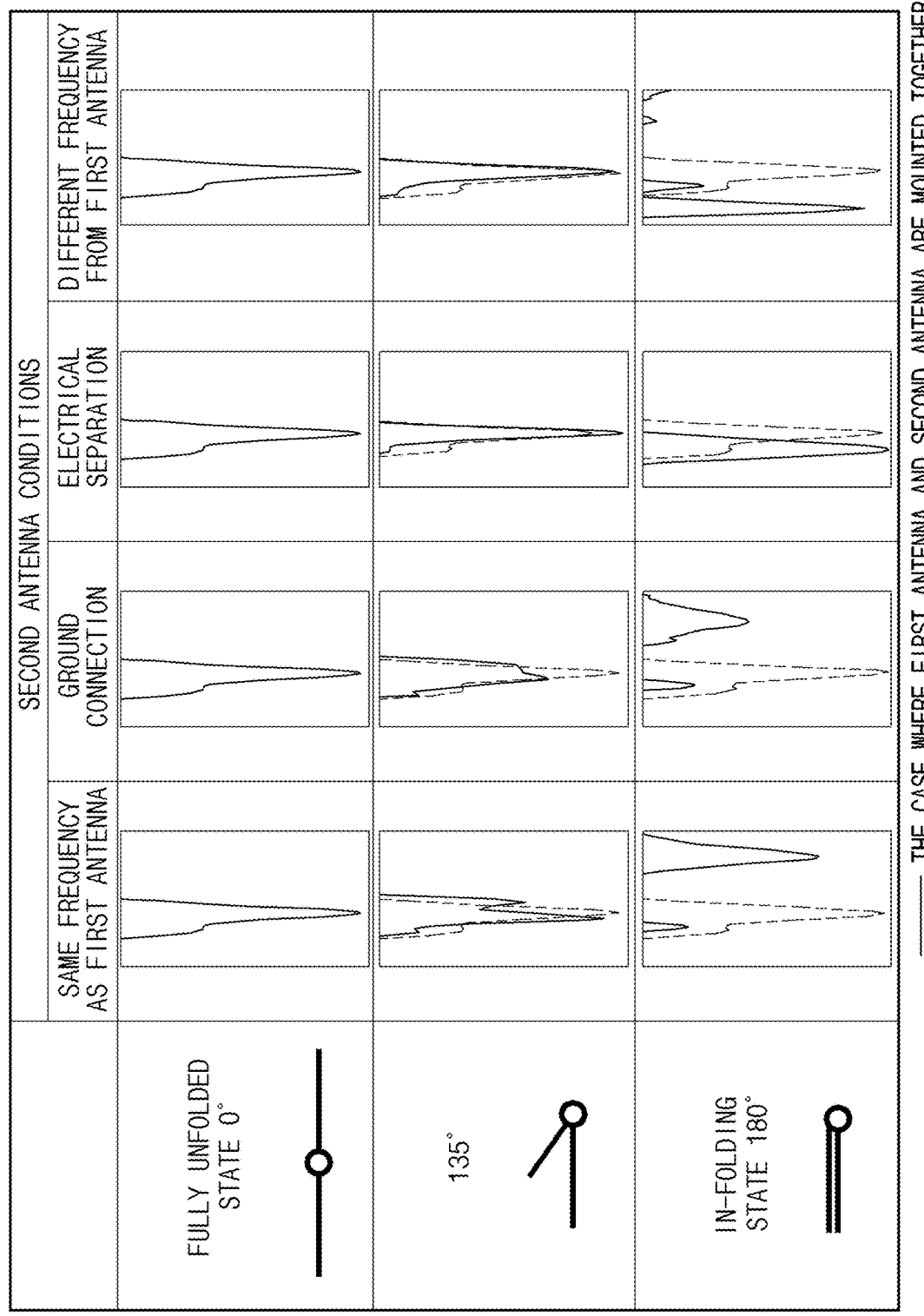
FIG. 4 illustrates a result of measuring a performance of an antenna of an electronic device according to various embodiments.

FIG. 4 illustrates a result of measuring a performance of an antenna of an electronic device according to various embodiments.

According to various embodiments, Table 400 illustrates performances of the first antenna (e.g., the first radiator 130) included in the first structure 210 and the second antenna (e.g., the second radiator 150) included in the second structure 220. The first radiator 130 of the first antenna and the second radiator 150 of the second antenna may at least partially overlap each other in the folded state.

Referring to Table 400, the performance of the first antenna has been measured under the following conditions: (1) the case where the first antenna and the second antenna resonate at similar frequency bands and both the first antenna and the second antenna operate in the folded state, (2) the case where the first antenna and the second antenna resonate at similar frequency bands and the second radiator 150 of the second antenna is connected to the ground region in the folded state, (3) the case where the first antenna and the second antenna resonate at similar frequency bands and the second radiator 150 of the second antenna is electrically separated in the folded state, and (4) the case where the first antenna and the second antenna resonate at different frequency bands and both the first antenna and the second antenna operate in the folded state.

Compared with the case where the first antenna is solely mounted on the electronic device 100, in the case of (1), in the folded state, the performance of the first antenna may be greatly degraded, and a resonant frequency is shifted. Likewise, in the case of (2), the performance of the first antenna may be greatly degraded, and the resonant frequency is shifted. In the case of (4), the degradation of performance and the shift of the resonant frequency are improved; however, the case of (3) shows a better result than the case of (4). Accordingly, the performance of the first antenna (e.g., the first radiator 130) may be maintained by electrically separating the second radiator 150 from the wireless communication circuit 120 in the folded state.

Referring to Table 400, it is observed that the degradation due to the overlapping becomes serious when the first antenna and the second antenna transmit/receive signals in similar frequency bands. The degradation of performance of the antennas may be prevented by setting one of overlapping radiators to a floating state.

Figure 5:
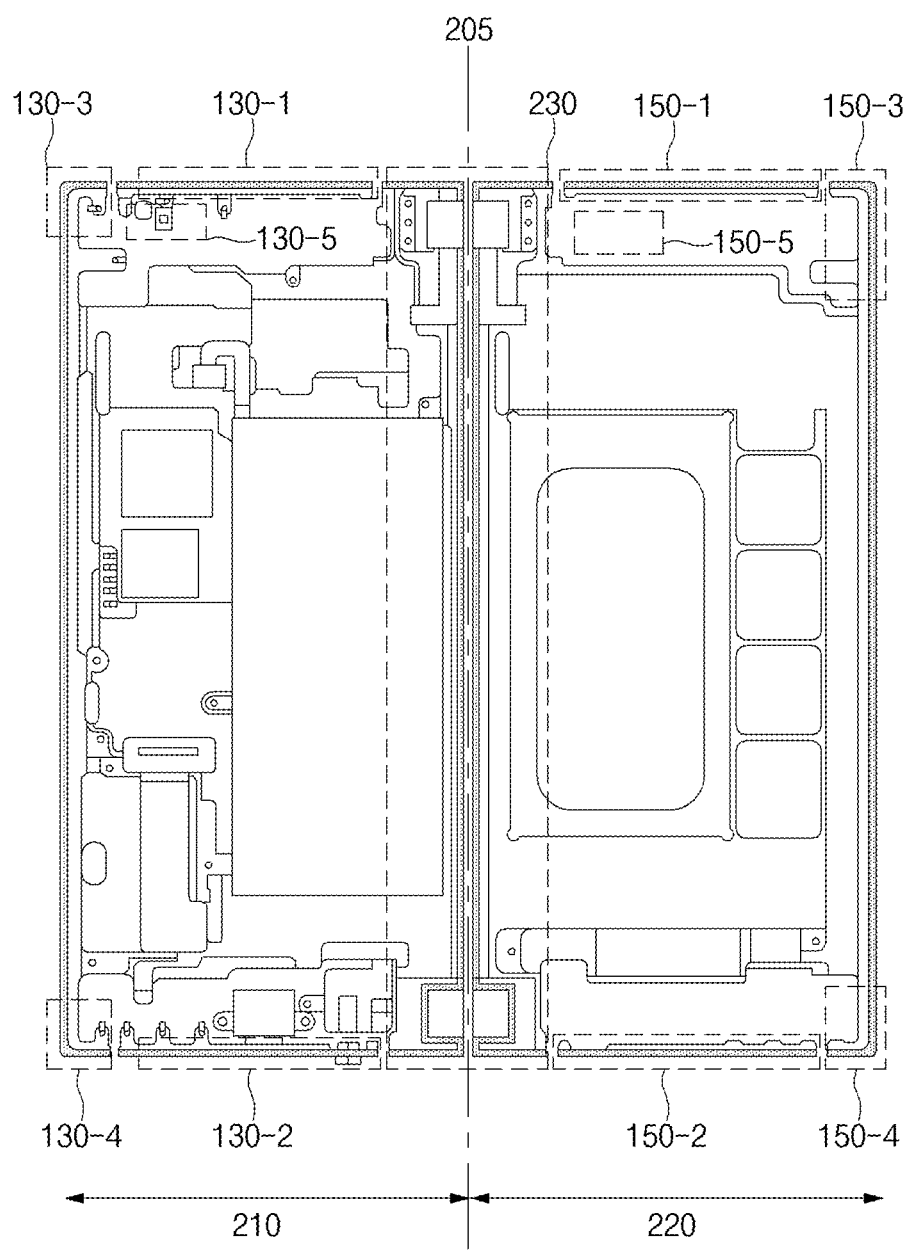
FIG. 5 illustrates a view of a structure in which a plurality of antennas included in an electronic device according to an embodiment are mounted.

FIG. 5 illustrates a view of a structure in which a plurality of antennas included in an electronic device according to an embodiment are mounted.

In various embodiments, the electronic device 100 may include a plurality of antennas. In the electronic device 100 having a folding structure, in the case where all antennas are implemented in the first structure 210, it is difficult to secure performances of the antennas. In particular, in the case where the electronic device 100 includes the hinge structure 230, a space in which the antennas are able to be mounted may be further limited. In the case where the antennas are disposed in a more limited space, it is difficult to secure performances of the antennas.

In various embodiments, the plurality of antennas may be included in the first structure 210 and the second structure 220. In this case, when the electronic device 100 is in the flat state, all the antennas included in the first structure 210 and the second structure 220 may operate. When the electronic device 100 is in the folded state, the antennas included in the second structure 220 may be electrically separated from a wireless communication circuit (e.g., the wireless communication circuit 120 of FIG. 1) and thus may not operate.

For example, the electronic device 100 may include a receiving antenna for LTE communication and an antenna for Wi-Fi. For example, the receiving antenna for LTE communication may include a first LTE antenna of a first frequency band ranging from 617 MHz to 960 MHz, a second LTE antenna of a second frequency band ranging from 1447.9 MHz to 2200 MHz, a third LTE antenna of a third frequency band ranging from 2300 Mhz to 2690 Mhz, and a fourth LTE antenna of a fourth frequency band ranging from 3400 Mhz to 3800 Mhz. A wireless communication circuit (e.g., the wireless communication circuit 120) may perform LTE communication and Wi-Fi communication by using the antenna for LTE communication and the antenna for Wi-Fi.

In various embodiments, the receiving antennas for LTE communication may use a housing as a radiator. A radiator may be understood as a partial region of a metal housing. For example, the first LTE antenna may include the (1-1)-th radiator 130-1 and the (1-2)-th radiator 130-2. The second LTE antenna may include a (1-3)-th radiator 130-3, a (1-4)-th radiator 130-4, the (2-1)-th radiator 150-1, and the (2-2)-th radiator 150-2. The third LTE antenna may include the (1-3)-th radiator 130-3, the (1-4)-th radiator 130-4, the (2-1)-th radiator 150-1, and the (2-2)-th radiator 150-2. The fourth LTE antenna may include the (1-1)-th radiator 130-1, the (1-2)-th radiator 130-2, a (2-3)-th radiator 150-3, and a (2-4)-th radiator 150-4.

In various embodiments, the electronic device 100 may include a conductive pattern (not illustrated). The conductive pattern may be, for example, a laser direct structuring (LDS) pattern formed on a PCB (e.g., the first PCB 160 and the second PCB 170 of FIG. 3) included in the electronic device 100. However, the disclosure is not limited thereto. For example, the conductive pattern may be understood as any one of metal members included in the electronic device 100. For example, the Wi-Fi antenna may include a conductive pattern. For example, the conductive pattern may be disposed in a first region 130-5 and/or a second region 150-5.

The radiators (130-1, 130-2, 130-3, 130-4, and the conductive pattern of the first region 130-5) disposed in the first structure 210 may be referred to as the "first radiator 130" of FIG. 1, and the radiators (150-1, 150-2, 150-3, 150-4, and the conductive pattern of the second region 150-5) disposed in the second structure 220 may be referred to as the "second radiator 150" of FIG. 1.

In an embodiment, the (2-1)-th radiator 150-1, the (2-2)-th radiator 150-2, the (2-3)-th radiator 150-3, the (2-4)-th radiator 150-4, and the conductive pattern of the second region 150-5 disposed in the second structure 220 may be electrically separated from a wireless communication circuit. As described above with reference to FIGS. 2A to 2C, the radiators disposed in the second structure 220 may be electrically connected with switches (e.g., the switch 140-1 and the switch 140-2 of FIG. 2). Each of the switches may be configured to be open in the folded state.

Figure 6:
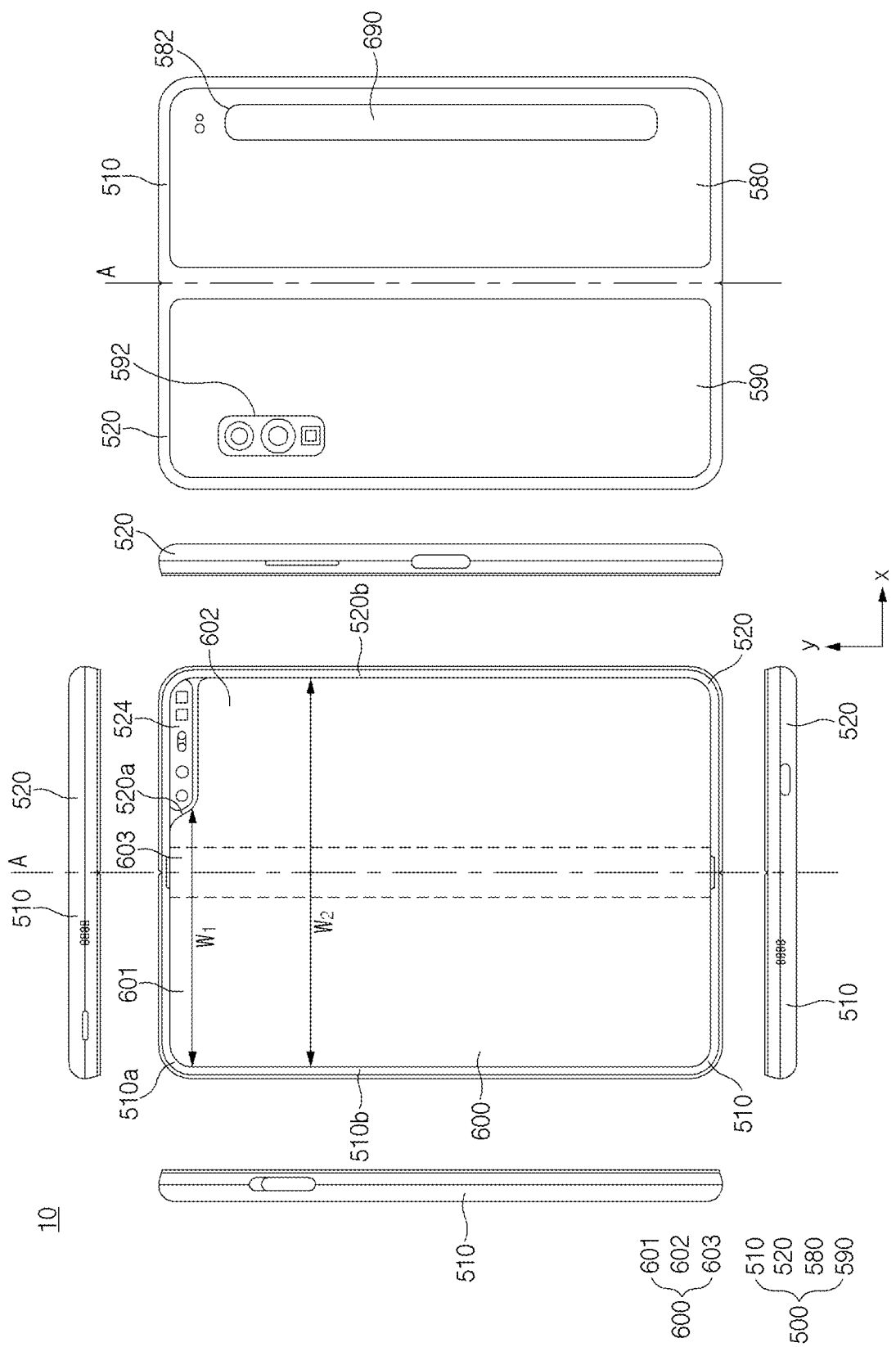
FIG. 6 illustrates a view of a flat state of a foldable device according to various embodiments.
Figure 7A:
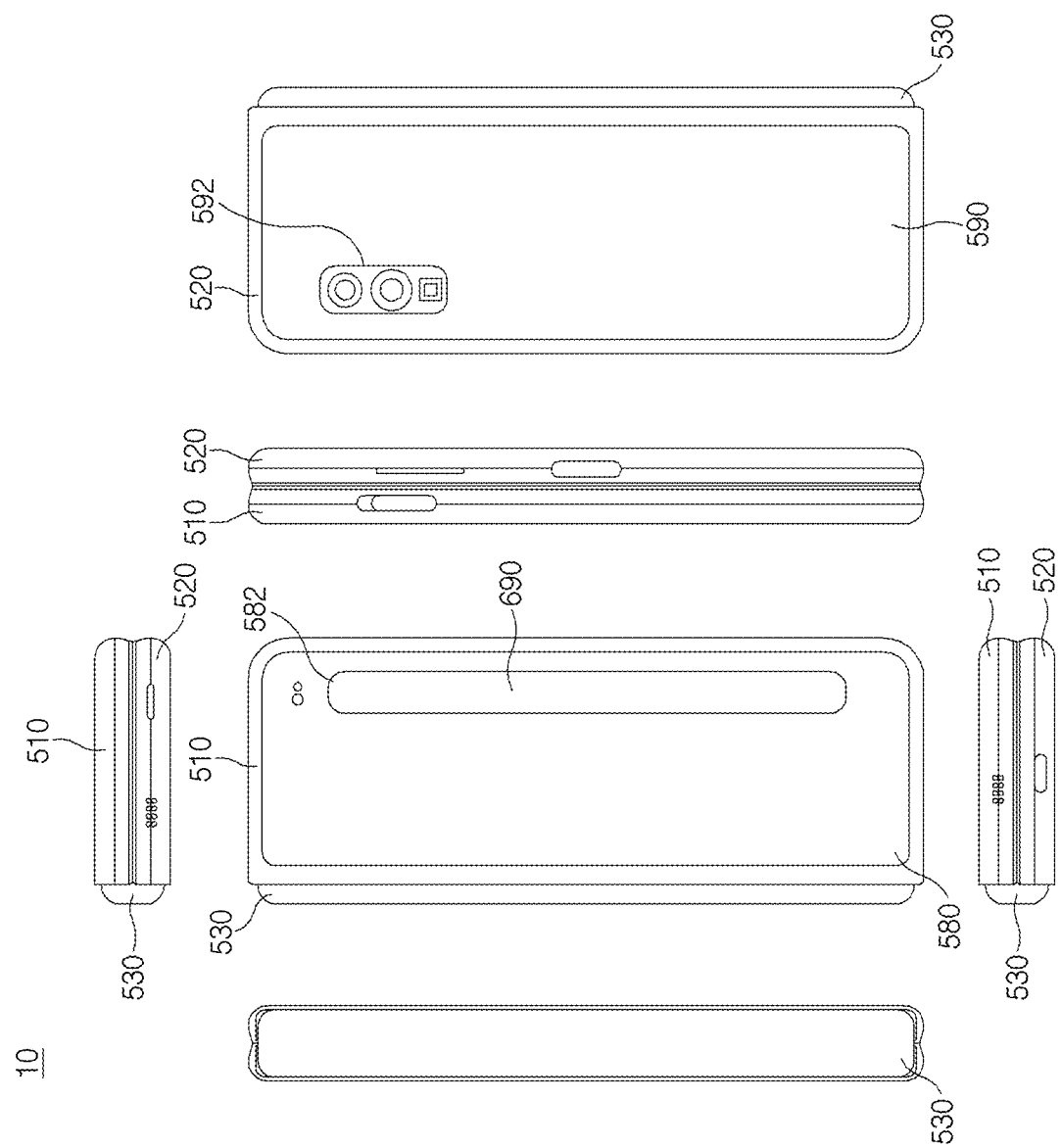
FIG. 7A illustrates a view of a folded state of a foldable device according to various embodiments.
Figure 7B:
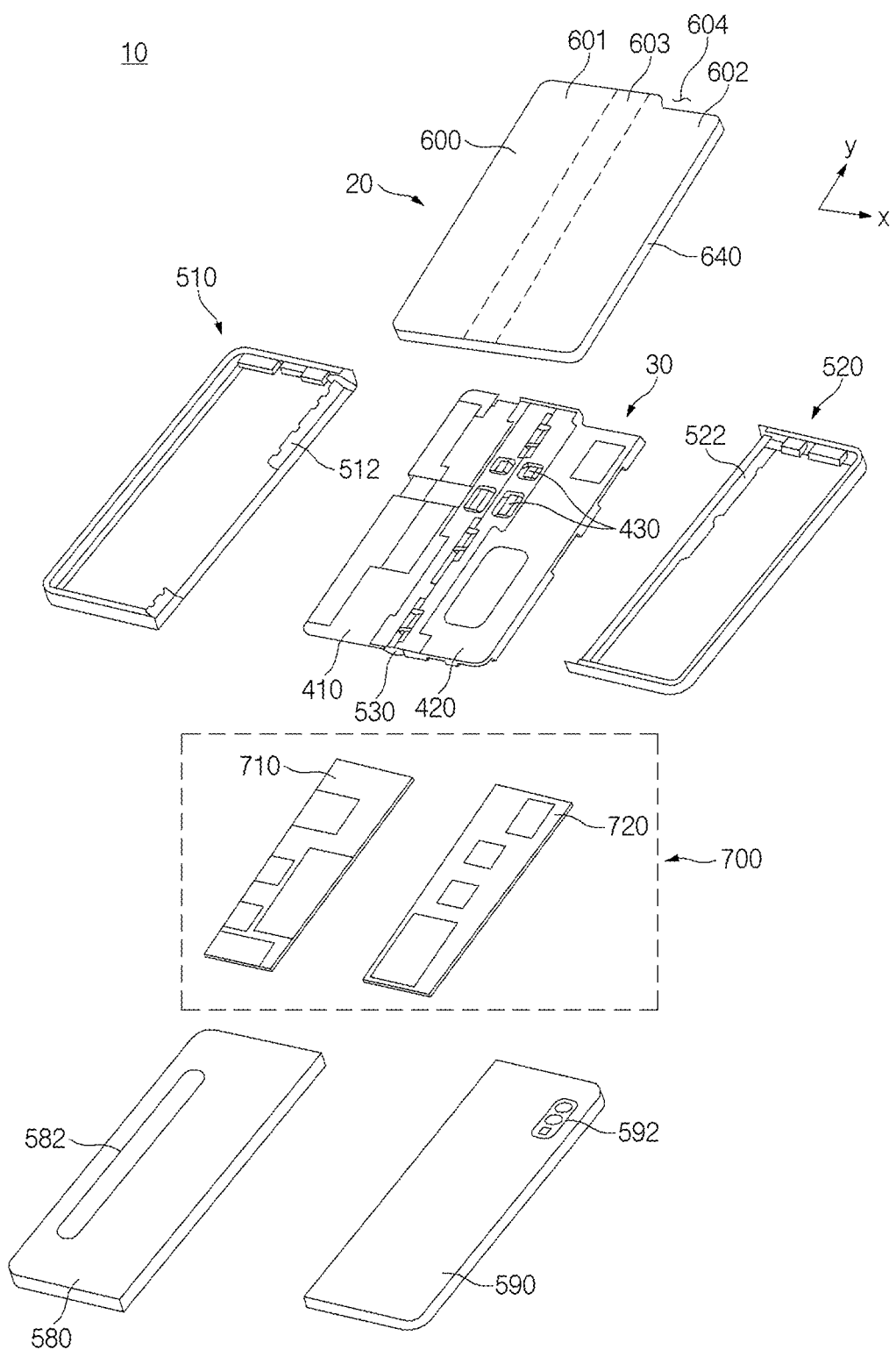
FIG. 7B illustrates an exploded perspective view of an electronic device according to an embodiment.

FIG. 6 illustrates a view of a flat state of a foldable device according to various embodiments. FIG. 7A illustrates a view of a folded state of a foldable device according to various embodiments. FIG. 7B illustrates an exploded perspective view of an electronic device according to an embodiment.

In various embodiments, the electronic device 100 of FIG. 1 may be an electronic device 10 including a foldable display 600. For example, the electronic device 10 may be understood as a portable electronic device such as a smartphone. FIG. 6 illustrates a view of the flat state of the electronic device 10 according to an embodiment. FIG. 7A illustrates a view of the folded state of the electronic device 10 according to an embodiment. Referring to FIGS. 6 and 7A, in an embodiment, the electronic device 10 (e.g., the electronic device 100 of FIG. 1) may include a foldable housing 500 (e.g., the housing 200 of FIG. 2), a hinge structure 530 covering a foldable portion of the foldable housing 500, and the flexible or foldable display 600 (hereinafter referred to as a "display 600") disposed in a space defined by the foldable housing 500. Below, a surface on which the display 600 is disposed defines a first surface or a front surface of the electronic device 10. A surface facing away from the front surface defines a second surface or a back surface of the electronic device 10. Also, a surface surrounding a space between the first surface and the second surface defines a third surface or a side surface of the electronic device 10.

In an embodiment, the foldable housing 500 may include a first housing structure 510 (e.g., the first structure 210 of FIG. 2), a second housing structure 520 (e.g., the second structure 220 of FIG. 2), a first back cover 580, and a second back cover 590. The foldable housing 500 of the electronic device 10 may not be limited to the shape and connection illustrated in FIGS. 6 and 7A, and may be implemented in another shape or by a combination and/or connection of other components. For example, in another embodiment, the first housing structure 510 and the first back cover 580 may be integrally formed, and the second housing structure 520 and the second back cover 590 may be integrally formed.

In an embodiment illustrated, the first housing structure 510 and the second housing structure 520 may be disposed on opposite sides with respect to a folding axis (axis "A") (e.g., the first axis 205 of FIG. 2) and may have an overall symmetrical shape with respect to the folding axis "A". As will be described later, an angle formed by the first housing structure 510 and the second housing structure 520 or a distance between the first housing structure 510 and the second housing structure 520 may vary depending on whether a state of the electronic device 10 is the flat state, the folded state, or the intermediate state. In an embodiment illustrated, unlike the first housing structure 510, the second housing structure 520 may additionally include a sensor region 524 in which various sensors are disposed, but may have a symmetrical shape with the first housing structure 510 in the remaining region.

In an embodiment, as illustrated in FIG. 6, the first housing structure 510 and the second housing structure 520 may form a recess accommodating the display 600 together. In an embodiment illustrated, due to the sensor region 524, the recess may have two or more different widths w1 and w2 in a direction perpendicular to the folding axis "A".

For example, the recess may have (1) the first width w1 between a first portion 510*a* of the first housing structure 510, which is parallel to the folding axis "A", and a first portion 520*a* of the second housing structure 520, which is formed at a periphery of the sensor region 524, and (2) the second width w2 defined by a second portion 510*b* of the first housing structure 510 and a second portion 520*b* of the second housing structure 520, which does not correspond to the sensor region 524 and is parallel to the folding axis "A". In this case, the second width w2 may be formed to be longer than the first width w1. In other words, the first portion 510*a* of the first housing structure 510 and the first portion 520*a* of the second housing structure 520, which are asymmetrical in shape, may form the first width w1 of the recess, and the second portion 510*b* of the first housing structure 510 and the second portion 520*b* of the second housing structure 520, which are symmetrical in shape, may form the second width w2 of the recess. In an embodiment, distances from the folding axis "A" to the first portion 520*a* and the second portion 520*b* of the second housing structure 520 may be different from each other. The width of the recess is not limited to the example illustrated. In various embodiments, the recess may have a plurality of widths due to a shape of the sensor region 524 or a portion in which the first housing structure 510 and the second housing structure 520 are asymmetrical in shape.

In an embodiment, at least a portion of the first housing structure 510 and the second housing structure 520 may be formed of a metal material or a nonmetal material having rigidity of a magnitude selected to support the display 600. The first housing structure 510 and the second housing structure 520 may include a metal region. At least a portion of the metal region may operate as a radiator (e.g., the first radiator 130 or the second radiator 150 of FIG. 1) of an antenna included in the electronic device 10. In various embodiments, the side surface (e.g., a metal bezel) of the first housing structure 510 and the second housing structure 520 may be formed of a metal material. At least some regions of the side surface may operate as a radiator of an antenna.

In an embodiment, the sensor region 524 may be formed adjacent to one corner of the second housing structure 520 so as to have a certain region. However, the disposition, shape, and size of the sensor region 524 are not limited to the example illustrated. For example, in another embodiment, the sensor region 524 may be provided at another corner of the sensor housing structure 520 or in any region between an upper corner and a lower corner thereof. In an embodiment, components that are embedded in the electronic device 10 for the purpose of performing various functions may be exposed toward the front surface of the electronic device 10 through the sensor region 524 or through one or more openings provided in the sensor region 524. In various embodiments, the components may include various kinds of sensors. The sensors may include, for example, at least one of a front camera, a receiver, or a proximity sensor.

The first back cover 580 may be disposed on one side of the back surface of the electronic device 10 with respect to the folding axis "A" and may have, for example, a substantially rectangular periphery, and the periphery may be surrounded by the first housing structure 510. As in the above description, the second back cover 590 may be disposed on an opposite side of the back surface of the electronic device 10 with respect to the folding axis "A", and a periphery thereof may be surrounded by the second housing structure 520.

In an embodiment illustrated, the first back cover 580 and the second back cover 590 may have a substantially symmetrical shape with respect to the folding axis (axis "A"). However, the shape of the first back cover 580 and the second back cover 590 may not be limited to the substantially symmetrical shape. In another embodiment, the electronic device 10 may include the first back cover 580 and the second back cover 590 of various shapes. In another embodiment, the first back cover 580 may be integrally formed with the first housing structure 510, and the second back cover 590 may be integrally formed with the second housing structure 520.

In an embodiment, the first back cover 580, the second back cover 590, the first housing structure 510, and the second housing structure 520 may form a space where various components (e.g., the first PCB 160 of FIG. 3, the second PCB 170 of FIG. 3, and a battery) of the electronic device 10. In an embodiment, one or more components may be disposed on the back surface of the electronic device 10 or may be visually exposed. For example, at least a portion of a sub display 690 may be visually exposed through a first back region 582 of the first back cover 580. In another embodiment, one or more components or sensors may be visually exposed through a second back region 592 of the second back cover 590. In various embodiments, the sensor may include a proximity sensor and/or a rear camera.

Figure 8A:
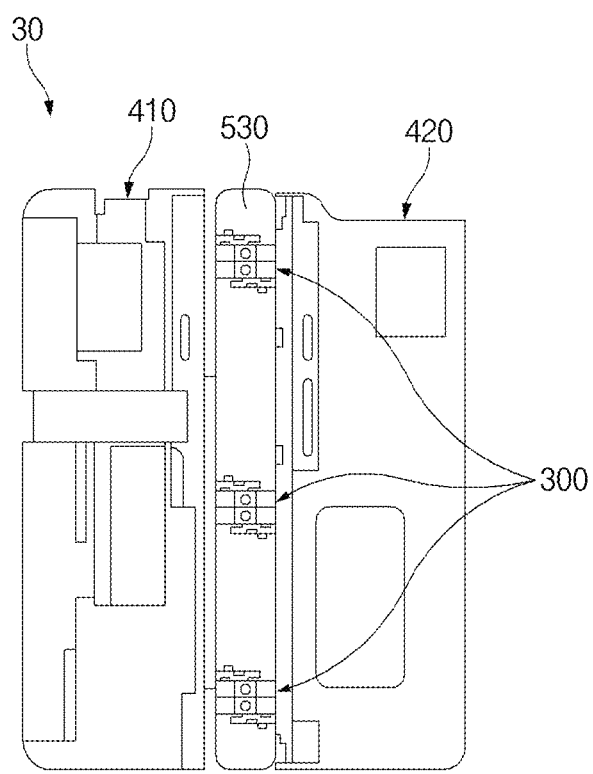
FIG. 8A illustrates a view of a structure of a foldable device including a hinge structure according to various embodiments.

Referring to FIG. 8A, the hinge structure 530 may be disposed between the first housing structure 510 and the second housing structure 520 to cover an inner component (e.g., a hinge structure). In an embodiment, depending on a state (flat state or folded state) of the electronic device 10, the hinge structure 530 may be covered by a portion of the first housing structure 510 and the second housing structure 520 or may be exposed to the outside.

Figure 8B:
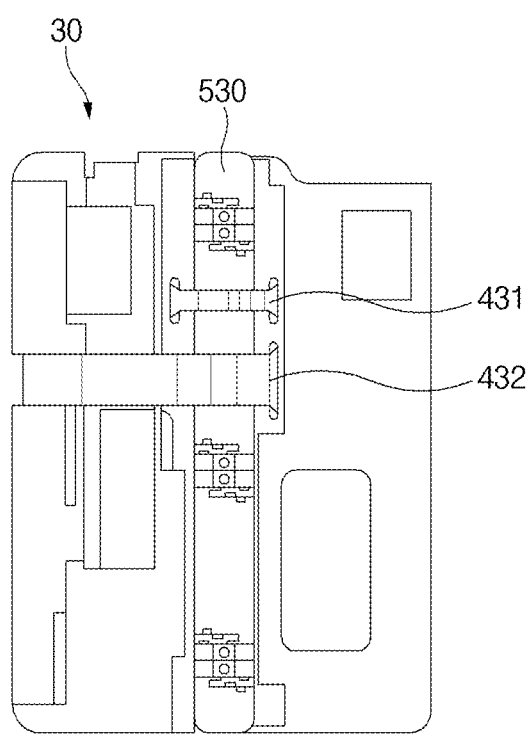
FIG. 8B illustrates a view of a structure of a foldable device including a hinge structure according to various embodiments.
Figure 8C:
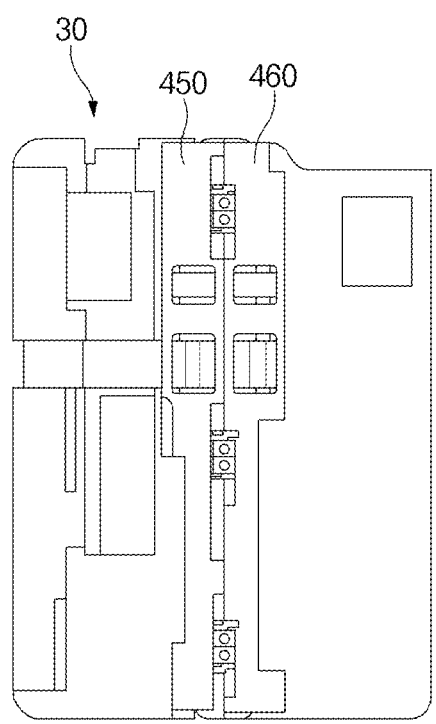
FIG. 8C illustrates a view of a structure of a foldable device including a hinge structure according to various embodiments.

For example, as illustrated in FIG. 6, in the case where the electronic device 10 is in the flat state, the hinge structure 530 may be covered by the first housing structure 510 and the second housing structure 520 and may not be exposed. For example, as illustrated in FIGS. 8A to 8C, in the case where the electronic device 10 is in the folded state (e.g., the fully folded state), the hinge structure 530 may be exposed between the first housing structure 510 and the second housing structure 520. For example, in the case of an intermediate state where the first housing structure 510 and the second housing structure 520 are folded with a certain angle, a portion of the hinge structure 530 may be exposed to the outside between the first housing structure 510 and the second housing structure 520. However, in this case, the exposed region may be smaller than in the fully folded state. In an embodiment, the hinge structure 530 may include a curved surface.

The display 600 may be disposed on a space defined by the foldable housing 500. For example, the display 600 may be seated on the recess formed by the foldable housing 500 and may occupy most of the front surface of the electronic device 10.

Accordingly, the front surface of the electronic device 10 may include the display 600, a partial region of the first housing structure 510, a partial region of the second housing structure 520, and the partial regions thereof may be adjacent to the display 600. The back surface of the electronic device 10 may include the first back cover 580, a partial region of the first housing structure 510 adjacent to the first back cover 580, the second back cover 590, and a partial region of the second back cover 590 adjacent to the second back cover 590.

The display 600 may mean a display, at least a portion of which is able to be deformed to a flat surface or a curved surface. In an embodiment, the display 600 may include a folding region 603, a first region 601 disposed on one side (a left side of the folding region 603 illustrated in FIG. 6) with respect to the folding region 603, and a second region 602 disposed on an opposite side (a right side of the folding region 603 illustrated in FIG. 6).

The division of the display 600 into regions, which is described with reference to FIG. 6, is exemplary, and the display 600 may be divided into a plurality of (e.g., four or more or two) regions depending on a structure or function thereof. For example, in the embodiment illustrated in FIG. 6, the display 600 may be divided into regions by the folding region 603 or the folding axis (axis "A") extending parallel to an y-axis; however, in another embodiment, the display 600 may be divided into regions with respect to another folding region (e.g., a folding region parallel to an x-axis) or another folding axis (e.g., a folding axis parallel to the x-axis).

The first region 601 and the second region 602 may have an overall symmetrical shape with respect to the folding region 603. However, unlike the first region 601, the second region 602 may include a notch that is cut depending on the existence of the sensor region 524 but may be symmetrical to the first region 601 in shape in the remaining region. In other words, the first region 601 and the second region 602 may include a portion having a symmetrical shape and a portion having an asymmetrical shape.

Below, there will be described an operation of the first housing structure 510 and the second housing structure 520 and each region of the display 600 depending on a state (flat state or folded state) of the electronic device 10.

In an embodiment, when the electronic device 10 is in the flat state (e.g., FIG. 6), the first housing structure 510 and the second housing structure 520 may form an angle of 180 degrees and may be disposed to face the same direction. In the display 600, a surface of the first region 601 and a surface of the second region 602 may form an angle of 180 degrees and may face the same direction (e.g., a front direction of an electronic device). The folding region 603 may form the same plane as the first region 601 and the second region 602.

In an embodiment, when the electronic device 10 is in the folded state (e.g., FIG. 7A), the first housing structure 510 and the second housing structure 520 may be disposed to face each other. In the display 600, the surface of the first region 601 and the surface of the second region 602 may form a narrow angle (e.g., between 0 degree and 10 degrees) and may face each other. At least a portion of the folding region 603 may be formed of a curved surface having a certain curvature.

In an embodiment, when the electronic device 10 is in the intermediate state(e.g., folded state), the first housing structure 510 and the second housing structure 520 may be disposed with a certain angle. In the display 600, the surface of the first region 601 and the surface of the second region 602 may form an angle greater than in the folded state and smaller than in the flat state. At least a portion of the folding region 603 may be formed of a curved surface having a certain curvature; in this case, the curvature may be smaller than in the folded state.

Referring to FIG. 7B, in an embodiment, the electronic device 10 may include a display unit 20, a bracket assembly 30, a substrate part 700, the first housing structure 510, the second housing structure 520, the first back cover 580, and the second back cover 590. In the specification, the display unit 20 may be called a "display module" or a "display assembly".

The display unit 20 may include the display 600, and at least one plate or layer 640 where the display 600 is seated. In an embodiment, the plate 640 may be interposed between the display 600 and the bracket assembly 30. The display 600 may be disposed at a portion of one surface (e.g., an upper surface with respect to FIG. 7B) of the plate 640. The plate 640 may be formed in a shape corresponding to a shape of the display 600. For example, a partial region of the plate 640 may be formed in a shape corresponding to a notch 604 of the display 600.

The bracket assembly 30 may include a first bracket 410, a second bracket 420, a hinge structure interposed between the first bracket 410 and the second bracket 420, a hinge cover 530 covering the hinge structure when viewed from the outside, and a wiring member 430 (e.g., a flexible printed circuit board (FPCB)) crossing the first bracket 410 and the second bracket 420.

In an embodiment, the bracket assembly 30 may be interposed between the plate 640 and the substrate part 700. For example, the first bracket 410 may be interposed between the first region 601 of the display 600 and a first substrate 710. The second bracket 420 may be interposed between the second region 602 of the display 600 and a second substrate 720.

In an embodiment, at least a portion of the wiring member 430 and the hinge structure 530 may be disposed in the bracket assembly 30. The wiring member 430 may be disposed in a direction (e.g., an x-axis direction) crossing the first bracket 410 and the second bracket 420. The wiring member 430 may be disposed in a direction (e.g., the x-axis direction) perpendicular to a folding axis (e.g., the y-axis or the folding axis "A" of FIG. 6) of the folding region 603.

As described above, the substrate part 700 may include the first substrate 710 disposed on a side of the first bracket 410 and the second substrate 720 disposed on a side of the second bracket 420. The first substrate 710 and the second substrate 720 may be disposed in a space defined by the bracket assembly 30, the first housing structure 510, the second housing structure 520, the first back cover 580, and the second back cover 590. Components for implementing various functions of the electronic device 10 may be mounted on the first substrate 710 and the second substrate 720.

The first housing structure 510 and the second housing structure 520 may be assembled to be connected to opposite sides of the bracket assembly 30 in a state where the display unit 20 is connected with the bracket assembly 30. As will be described later, the first housing structure 510 and the second housing structure 520 may be slid from the opposite sides of the bracket assembly 30 so as to be connected with the bracket assembly 30.

In an embodiment, the first housing structure 510 may include a first rotation support surface 512, and the second housing structure 520 may include a second rotation support surface 522 corresponding to the first rotation support surface 512. The first rotation support surface 512 and the second rotation support surface 522 may include a curved surface corresponding to the curved surface included in the hinge cover 530.

In an embodiment, when the electronic device 10 is in the flat state, the first rotation support surface 512 and the second rotation support surface 522 may cover the hinge cover 530, and thus, the hinge cover 530 may not be exposed toward the back surface of the electronic device 10 or may be minimally exposed. Meanwhile, when the electronic device 10 is in the folded state, the first rotation support surface 512 and the second rotation support surface 522 may rotate along the curved surface included in the hinge cover 530, and thus, the hinge cover 530 may be maximally exposed toward the back surface of the electronic device 10.

FIGS. 8A to 8C illustrate a view of a structure of a foldable device including a hinge structure according to various embodiments.

In an embodiment, the electronic device 10 may include the first bracket 410, the second bracket 420, and the hinge structure 530 interposed between the first bracket 410 and the second bracket 420.

In an embodiment, the first bracket 410 and the second bracket 420 may be disposed on opposite sides of the hinge structure 530. The first bracket 410 and the second bracket 420 may be connected with the hinge structure 530 to be rotatable. For example, the first bracket 410 and the second bracket 420 may include coupling holes (not illustrated). The connection may be made by using a coupling member penetrating the corresponding coupling holes included in the hinge structure 530. This connection manner is one example, and the disclosure may include various ways to couple the first and second brackets 410 and 420 and the hinge structure 530.

Wiring members 431 and 432 may be mounted on the first bracket 410, the second bracket 420, the hinge structure 530, and an assembly including the hinge structure 530. For example, in an embodiment in which the wiring members 431 and 432 are able to be inserted into an opening formed in the first bracket 410 and an opening formed in the second bracket 420, the housing 200 may include a first surface facing the first direction, a second surface facing a direction opposite to the first direction, and a side surface surrounding a space between the first surface and the second surface. For example, the housing 200 illustrated in FIGS. 2A to 2C may be a portion of the side surface. The side surface may be understood as a metal bezel.

In an embodiment, the first radiator 130 may be at least a portion of the side surface, which is included in the first structure 210, and the second radiator 150 may be at least a portion of the side surface, which is included in the second structure 220. For example, the first radiator 130 may be formed in a first region of the side surface, and the second radiator 150 may be formed in a second region of the side surface, which is electrically separated from the first region. The wiring members 431 and 432 may be attached to one surface of the first bracket 410 and one surface of the second bracket 420.

Figure 9:
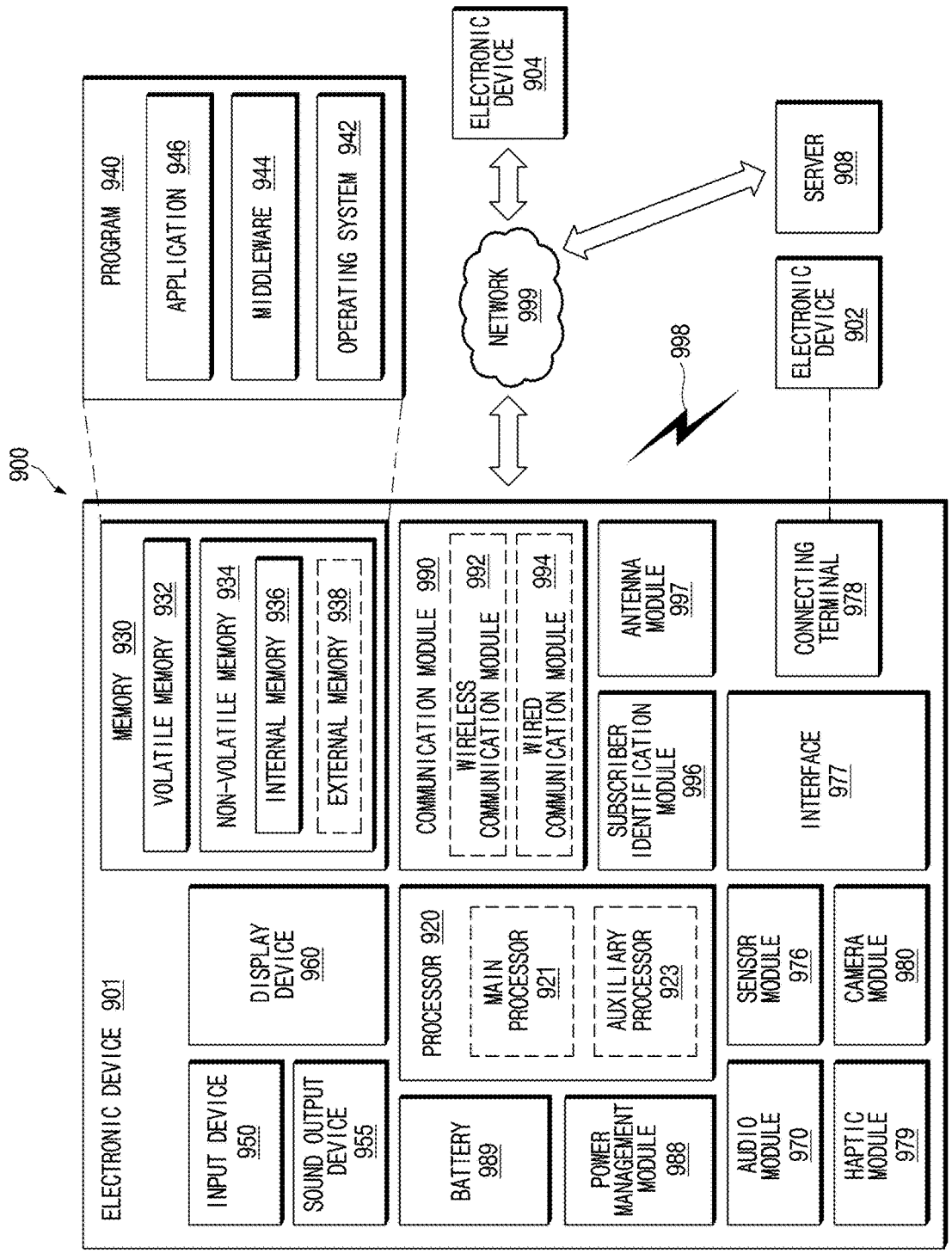
FIG. 9 illustrates an electronic device in a network environment according to various embodiments.

FIG. 9 illustrates a block diagram of an electronic device 901 in a network environment 900 according to various embodiments. Referring to FIG. 9, the electronic device 901 in the network environment 900 may communicate with an electronic device 902 via a first network 998 (e.g., a short-range wireless communication network), or an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input device 950, a sound output device 955, a display device 960, an audio module 970, a sensor module 976, an interface 977, a haptic module 979, a camera module 980, a power management module 988, a battery 989, a communication module 990, a subscriber identification module (SIM) 996, or an antenna module 997. In some embodiments, at least one (e.g., the display device 960 or the camera module 980) of the components may be omitted from the electronic device 901, or one or more other components may be added in the electronic device 901. In some embodiments, some of the components may be implemented as single integrated circuitry. For example, the sensor module 976 (e.g., a fingerprint sensor, an iris sensor, or an illuminance sensor) may be implemented as embedded in the display device 960 (e.g., a display).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may load a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thererto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by another component (e.g., the processor 920) of the electronic device 901, from the outside (e.g., a user) of the electronic device 901. The input device 950 may include, for example, a microphone, a mouse, or a keyboard.

The sound output device 955 may output sound signals to the outside of the electronic device 901. The sound output device 955 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. According to an embodiment, the display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. According to an embodiment, the audio module 970 may obtain the sound via the input device 950, or output the sound via the sound output device 955 or a headphone of an external electronic device (e.g., an electronic device 902) directly (e.g., wired) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wired) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector), The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. According to an embodiment, the antenna module 997 may include one or more antennas, and, therefrom, at least one antenna appropriate for a communication scheme used in the communication network, such as the first network 998 or the second network 999, may be selected, for example, by the communication module 990 (e.g., the wireless communication module 992). The signal or the power may then be transmitted or received between the communication module 990 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 and 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturers server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to embodiments of the disclosure, there may be implemented an antenna, the performance of which is not degraded even in a folded state of a foldable device.

Besides, a variety of effects directly or indirectly understood through this disclosure may be provided.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a first housing including a first metal region;
a second housing foldably connected with the first housing about a first axis and including a second metal region;
a flexible display disposed over at least a part of the first housing and at least a part of the second housing;
a first radiator forming at least a portion of the first metal region;
a second radiator forming at least a portion of the second metal region and disposed to face at least a portion of the first radiator in a folded state; and
at least one wireless communication circuit,
wherein the at least one wireless communication circuit is configured to be electrically connected with the first radiator and the second radiator in an unfolded state and to be electrically separated from the second radiator in the folded state,
wherein the at least one wireless communication circuit is electrically connected with the second radiator through a switch, and
wherein the switch is configured to be open in the folded state.

2. The electronic device of claim 1, further comprising:
a hinge foldably connecting the first housing and the second housing to enable the first housing and the second housing to be folded or unfolded about the first axis.

3. The electronic device of claim 2, wherein the hinge includes a metal material.

4. The electronic device of claim 3, wherein the at least one wireless communication circuit is disposed in the first housing and is electrically connected with the second radiator through a wiring structure of the hinge.

5. The electronic device of claim 1, further comprising:
a first printed circuit board (PCB) disposed in the first housing; and
a second PCB disposed in the second housing,
wherein the at least one wireless communication circuit is disposed on the first PCB, is electrically connected with the first radiator through a first feed line disposed on the first PCB, and is electrically connected with the second radiator through a second feed line disposed on the first PCB and the second PCB.

6. The electronic device of claim 5, wherein the second feed line comprises a switch.

7. The electronic device of claim 1, wherein the at least one wireless communication circuit is disposed in the first housing.

8. The electronic device of claim 1,
wherein the flexible display comprises a first region disposed in the first housing and a second region disposed in the structure housing, and
wherein the first region and the second region face each other in the folded state.

9. The electronic device of claim 1, further comprising:
a first conductive pattern disposed in the first housing; and
a second conductive pattern disposed in the second housing and disposed to face at least a portion of the first conductive pattern in the folded state.

10. The electronic device of claim 9, wherein:
the at least one wireless communication circuit is electrically connected with the second conductive pattern through a switch; and
the switch is configured to be open in the folded state.

11. The electronic device of claim 1, wherein:
the flexible display includes a first surface facing a first direction in the unfolded state,
the first housing and the second housing include a second surface facing a direction opposite to the first direction, and a side surface surrounding a space between the first surface and the second surface;
the first radiator is at least a portion of the side surface in the first housing; and
the second radiator is at least a portion of the side surface in the second housing.

12. The electronic device of claim 11, wherein:
the first radiator; and
the second radiator are electrically separated from each other in the unfolded state.

13. The electronic device of claim 12, wherein the first radiator and the second radiator contact each other in the folded state.

14. The electronic device of claim 11,
wherein the flexible display is visually exposed to the first direction in the unfolded state.

15. An electronic device comprising:
a first housing including a first metal region corresponding to a first radiator;
a hinge foldably connecting the first housing and a second housing;
the second housing including a second metal region corresponding to a second radiator;
a flexible display disposed over at least a part of the first housing and at least a part of the second housing;
at least one wireless communication circuit; and
a switch connected between the at least one communication circuit and the second radiator,
wherein the at least one wireless communication circuit is configured to:
close the switch to be electrically connected to the second radiator in an unfolded state, and
open the switch to be electrically separated from the second radiator in a folded state, and
wherein the first radiator and the second radiator are disposed to face each other in the folded state.

16. The electronic device of claim 15, wherein the hinge includes a metal material.

17. The electronic device of claim 16, wherein the at least one wireless communication circuit is disposed in the first housing and is electrically connected with the second radiator through a wiring structure of the hinge.

18. The electronic device of claim 15,
wherein the flexible display comprises a first region disposed in the first housing and a second region disposed in the second housing, and
wherein the first region and the second region face each other in the folded state.

19. The electronic device of claim 15, wherein:
the flexible display includes a first surface facing a first direction in the unfolded state,
the first housing and the second housing include a second surface facing a direction opposite to the first direction, and a side surface surrounding a space between the first surface and the second surface;

the first radiator is at least a portion of the side surface included in the first housing; and the second radiator is at least a portion of the side surface included in the second housing.

* * * * *